United States Patent
Sarrigeorgidis et al.

(10) Patent No.: US 9,961,632 B2
(45) Date of Patent: May 1, 2018

(54) DSP ASSISTED AND ON DEMAND RF AND ANALOG DOMAIN PROCESSING FOR LOW POWER WIRELESS TRANSCEIVERS

(71) Applicant: Apple Inc., Cupertino, CA (US)

(72) Inventors: Konstantinos Sarrigeorgidis, Sunnyvale, CA (US); Tarik Tabet, Los Gatos, CA (US); Moustafa M. Elsayed, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 198 days.

(21) Appl. No.: 14/860,773

(22) Filed: Sep. 22, 2015

(65) Prior Publication Data

US 2016/0095055 A1    Mar. 31, 2016

Related U.S. Application Data

(60) Provisional application No. 62/056,288, filed on Sep. 26, 2014.

(51) Int. Cl.
*H04B 1/00* (2006.01)
*H04B 1/525* (2015.01)
(Continued)

(52) U.S. Cl.
CPC ...... *H04W 52/0209* (2013.01); *H04B 1/0028* (2013.01); *H04B 1/10* (2013.01); *H04B 1/525* (2013.01); *Y02B 60/50* (2013.01)

(58) Field of Classification Search
None
See application file for complete search history.

(56) References Cited

U.S. PATENT DOCUMENTS 5,854,600 A * 12/1998 Johnson .................. G06J 1/00
                                                    341/110
7,106,809 B2    9/2006 Whikehart et al.
(Continued)

FOREIGN PATENT DOCUMENTS

JP    2004064130    2/2004
JP    2004506374    2/2004
(Continued)

OTHER PUBLICATIONS

UVA Center for Wireless Health; "Energy Fidelity Scalability"; http://wirelesshealth.virginia.edu/node/35; 2010; three pages.
(Continued)

*Primary Examiner* — Noel Beharry
*Assistant Examiner* — Richard Schnell
(74) *Attorney, Agent, or Firm* — Meyertons, Hood, Kivlin Kowert & Goetzel, P.C.; Jeffrey C. Hood

(57) ABSTRACT

A wireless user equipment (UE) device may include a receiver and transmitter. The UE device may dynamically vary the fidelity requirements imposed on the analog signal processing performed by the receiver and/or the transmitter in response factors such as: amount of signal interference (e.g., out-of-band signal power); modulation and coding scheme; number of spatial streams; extent of transmitter leakage; and size and/or frequency location of resources allocated to the UE device. Thus, the UE device may consume less power on average than a UE device that is designed to satisfy fixed fidelity requirements associated with a worst case reception scenario and/or a worst case transmission scenario.

19 Claims, 9 Drawing Sheets

(51) Int. Cl.
H04W 52/02 (2009.01)
H04B 1/10 (2006.01)

(56) References Cited

U.S. PATENT DOCUMENTS

| | | | |
|---|---|---|---|
| 7,356,074 B2* | 4/2008 | Shan | H04B 1/70757 |
| | | | 375/150 |
| 8,995,280 B2 | 3/2015 | Logvinov et al. | |
| 2009/0156148 A1* | 6/2009 | Lee, II | H04B 17/318 |
| | | | 455/226.2 |
| 2012/0002586 A1* | 1/2012 | Gainey | H04B 1/525 |
| | | | 370/315 |

FOREIGN PATENT DOCUMENTS

| | | |
|---|---|---|
| JP | 2006506900 | 2/2006 |
| JP | 2008219922 | 9/2008 |
| JP | 2010022009 | 1/2010 |
| JP | 2010500831 | 1/2010 |
| JP | 2013034203 | 2/2013 |
| WO | 2011161759 | 12/2011 |

OTHER PUBLICATIONS

Eric Hernaez; "How to Improve VoIP QoS for Wireless Users"; http://www.skyswitch.com/skyswitch-improves-voip-quality-sip-mobility; Oct. 15, 2014; four pages.

* cited by examiner

DSP ASSISTED AND ON DEMAND RF AND ANALOG DOMAIN PROCESSING FOR LOW POWER WIRELESS TRANSCEIVERS

PRIORITY CLAIM INFORMATION

This application claims priority to U.S. Provisional Application No. 62/056,288, filed Sep. 26, 2014, titled "DSP Assisted and On Demand RF and Analog Domain Processing for Low Power Wireless Transceivers", by Konstantinos Sarrigeorgidis, Tarik Tabet and Moustafa Elsayed. That provisional application is hereby incorporated by reference in its entirety as though fully and completely set forth herein.

FIELD

The present application relates to wireless communication, and more particularly, to mechanisms for reducing average power consumption in a user device by dynamically controlling the extent of signal processing fidelity provided by a receiver and/or transmitter of the user device.

DESCRIPTION OF THE RELATED ART

The wireless receiver used by a user equipment (UE) device to receive downlink transmissions includes circuits that are not perfectly linear or ideal in their circuit behavior. Wireless communication standards may impose requirements on the fidelity of signal processing performed by the circuits. Those requirements are, however, typically based on worst case scenarios, e.g., a worst case interference environment. Thus, the UE device may often be operating in an environment that is considerably better than the worst case scenarios. If the receiver is designed with circuitry that will always meet the fidelity requirements, the circuitry may have high power consumption, which limits the battery life of the UE device, and high complexity, which adds to system cost. (High fidelity is expensive in terms of power consumption.) Thus, there exists a need for UE devices capable of adjusting the extent of signal processing fidelity required of (and/or provided by) various circuit elements in the receiver.

Similarly, the wireless transmitter used by a UE device to transmit uplink signals includes circuits that are not perfectly linear or ideal in their circuit behavior. Thus, there exists a need for UE devices capable of adjusting the extent of signal processing fidelity required of (and/or provided by) various circuit elements in the transmitter.

SUMMARY

In one set of embodiments, a wireless receiver of a UE device may be configured as follows, in order to decrease average power consumption of the receiver.

The receiver may receive an RF signal from a wireless transmission medium using one or more antennas. The receiver may operate on the RF signal with one or more analog circuits to obtain an analog intermediate signal. The analog intermediate signal is sampled using an analog-to-digital conversion (ADC) circuit to obtain a digital signal. The receiver may analyze the RF signal or the analog intermediate signal or the digital signal to determine a level of signal processing fidelity that the receiver should satisfy. For example, when the analyzed signal is interference free, the level of signal processing fidelity may be relaxed. A controller (e.g., a digital processor) may modify the configuration of the receiver based on the determined level of signal processing fidelity. The action of modifying the receiver configuration may include one or more of the following: adjusting a level of analog processing fidelity of at least one of the one or more analog circuits; and processing the digital signal using one or more digital circuits to correct analog domain distortions introduced by the one or more analog circuits.

The analyzing operation and the modifying operation may be performed dynamically while the RF signal is being received. In one embodiment, the analyzing operation and the modifying operation are performed continuously and/or repetitively in order to respond to dynamic changes in RF signal environment.

In one set of embodiments, a wireless transmitter may be operated as follows, in order to decrease average power consumption of the transmitter.

The transmitter may convert a digital signal to an analog intermediate signal using a digital-to-analog conversion (DAC) circuit. The transmitter may generate an RF signal based on the analog intermediate signal using one or more analog circuits, e.g., analog circuits such as mixers, filters and amplifiers. A controller (e.g., a digital controller) may modify a configuration of the transmitter based on a level of signal processing fidelity that the transmitter should presently satisfy. The action of modifying the transmitter configuration may include one or more of the following: adjusting a level of analog processing fidelity of at least one of the one or more analog circuits; and modifying a configuration of one or more digital circuits so that the one or more digital circuits operate on the digital signal to pre-correct for distortions to be introduced by the one or more analog circuits, wherein said operating on the digital signal is performed prior to said converting.

Note that the techniques described herein may be implemented in and/or used with a number of different types of devices, including but not limited to, base stations, access points, cellular phones, portable media players, tablet computers, wearable devices (such as smart watches), and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
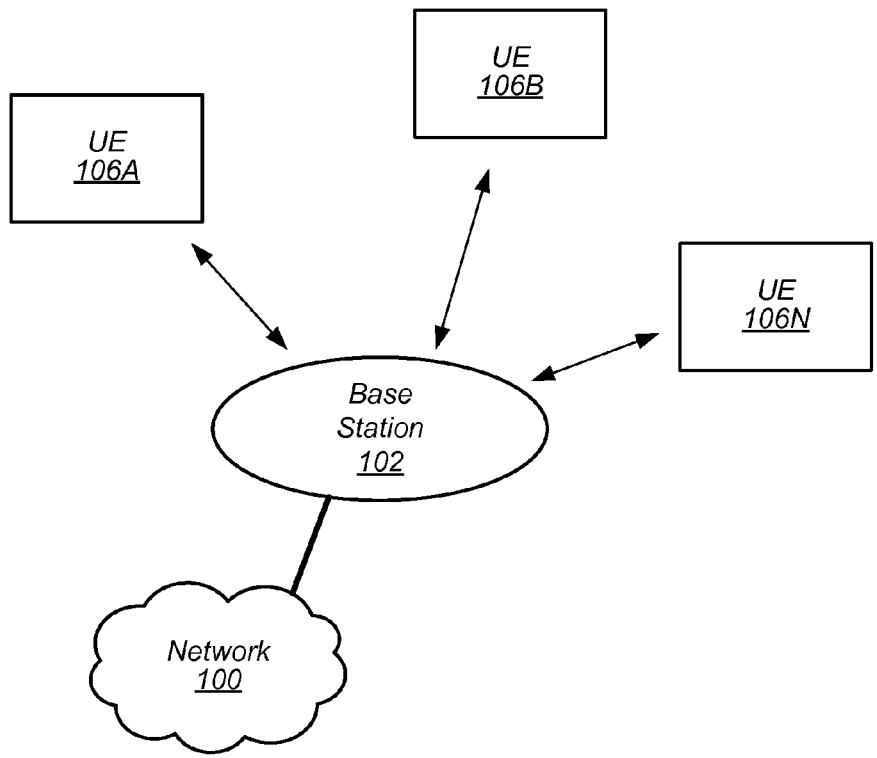
FIG. 1 illustrates an exemplary wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below.

AGC: Automatic Gain Control
BS: Base Station
DL: Downlink
FDMA: Frequency-Division Multiple Access
LTE: Long Term Evolution
MS: Mobile Station
NW: Network
OFDM: Orthogonal Frequency-Division Multiplexing
OFDMA: Orthogonal Frequency-Division Multiple Access
PDCCH: Physical Downlink Control Channel
PDSCH: Physical Downlink Shared Channel
RAT: Radio Access Technology
RRC: Radio Resource Control
RRC IE: RRC Information Element
RX: Reception
SC-FDMA: Single Carrier FDMA
TX: Transmission
UE: User Equipment
UL: Uplink
UMTS: Universal Mobile Telecommunication System
3GPP: Third Generation Partnership Project Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, wearable devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates a wireless communication system, according to some embodiments. It is noted that FIG. 1 represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells, e.g., cells provided by other base stations (which may be referred to as "neighboring cells"). Such cells may also be capable of facilitating communication between user devices and/or between user devices and the network 100.

Note that at least in some instances a UE device 106 may be capable of communicating using two or more wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
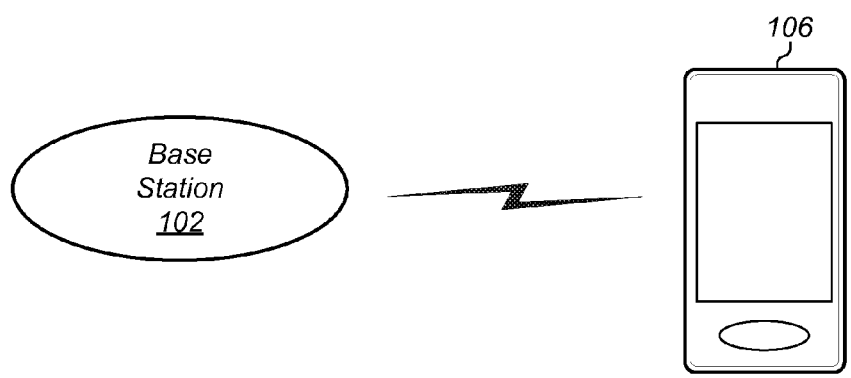
FIG. 2 illustrates a base station ("BS", or in the context of LTE, an "eNodeB" or "eNB") in communication with a wireless device, according to some embodiments.

FIG. 2 illustrates UE device 106 (e.g., one of the devices 106A through 106N) in communication with base station 102, according to some embodiments. The UE device 106 may have cellular communication capability, and as described above, may be a device such as a mobile phone, a hand-held device, a media player, a computer, a laptop or a tablet, a wearable device (such as a smart watch or smart glasses), or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array) that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In one embodiment, the UE device 106 might be configured to communicate using a single shared radio. The shared radio may couple to a single antenna, or may couple to a plurality of antennas (e.g., for MIMO operation) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 3:
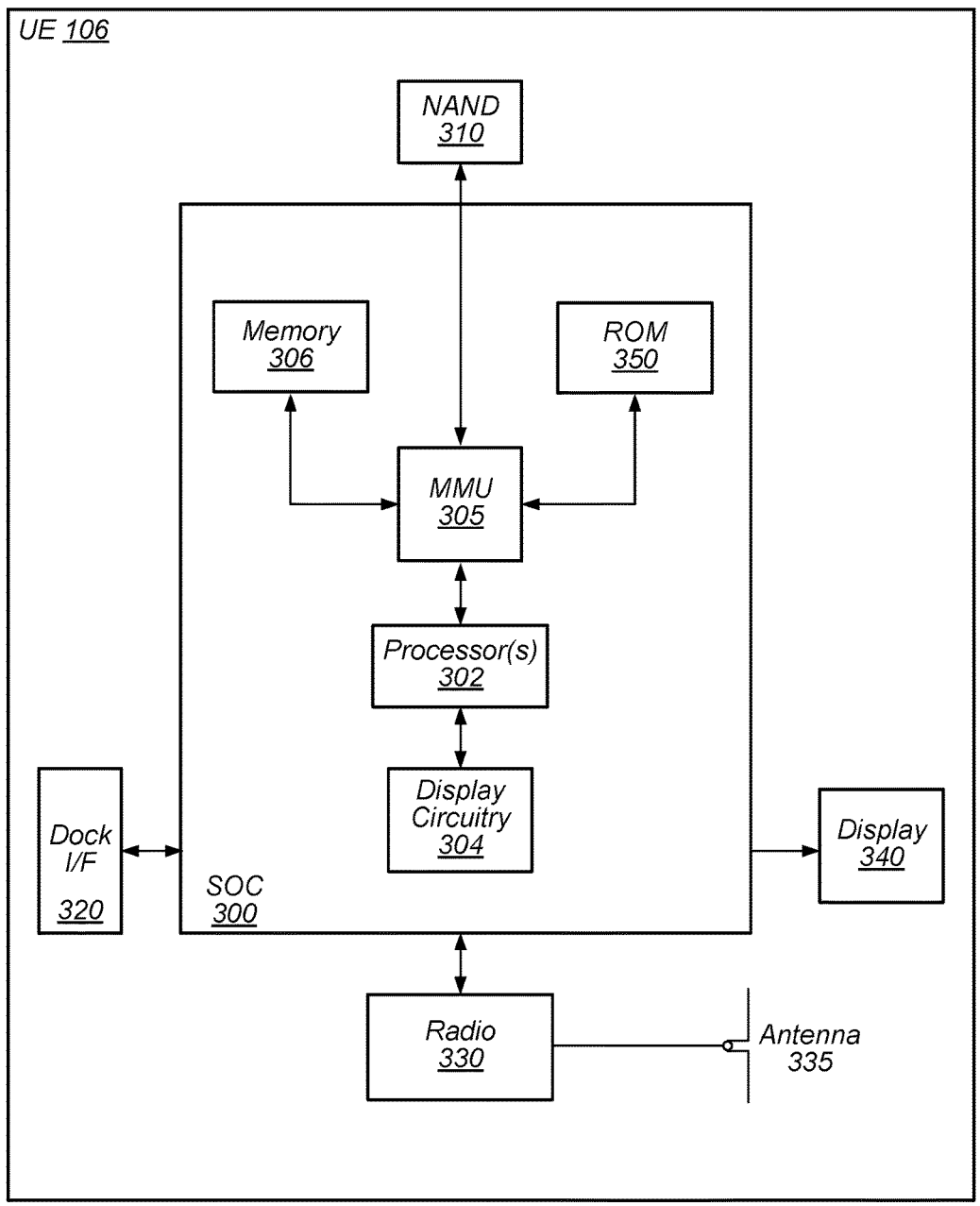
FIG. 3 illustrates an example of a wireless user equipment (UE) device, according to some embodiments.

FIG. 3—Example Block Diagram of a UE

FIG. 3 illustrates a block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 340. The processor(s) 302 may also be coupled to memory management unit (MMU) 305, which may be configured to receive addresses from the processor(s) 302 and translate those addresses to locations in memory (e.g., memory 306, read only memory (ROM) 350, NAND flash memory 310). The MMU 305 may be configured to perform memory protection and page table translation or set up. In some embodiments, the MMU 305 may be included as a portion of the processor(s) 302.

The UE 106 may also include other circuits or devices, such as the display circuitry 304, radio 330, connector I/F 320, and/or display 340.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to a computer system), the display 340, and wireless communication circuitry (e.g., for communication using LTE, CDMA2000, Bluetooth, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and/or software components for dynamically controlling the extent of signal processing fidelity of the radio 330 (e.g., a receiver and/or transmitter of the radio 330) according to embodiments disclosed herein.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), and/or as an ASIC (Application Specific Integrated Circuit).

In some embodiments, the UE 106 may be a smart device such as a smart watch or smart glasses. However, a wide variety of other realizations of the UE 106 are possible and contemplated.

Figure 4:
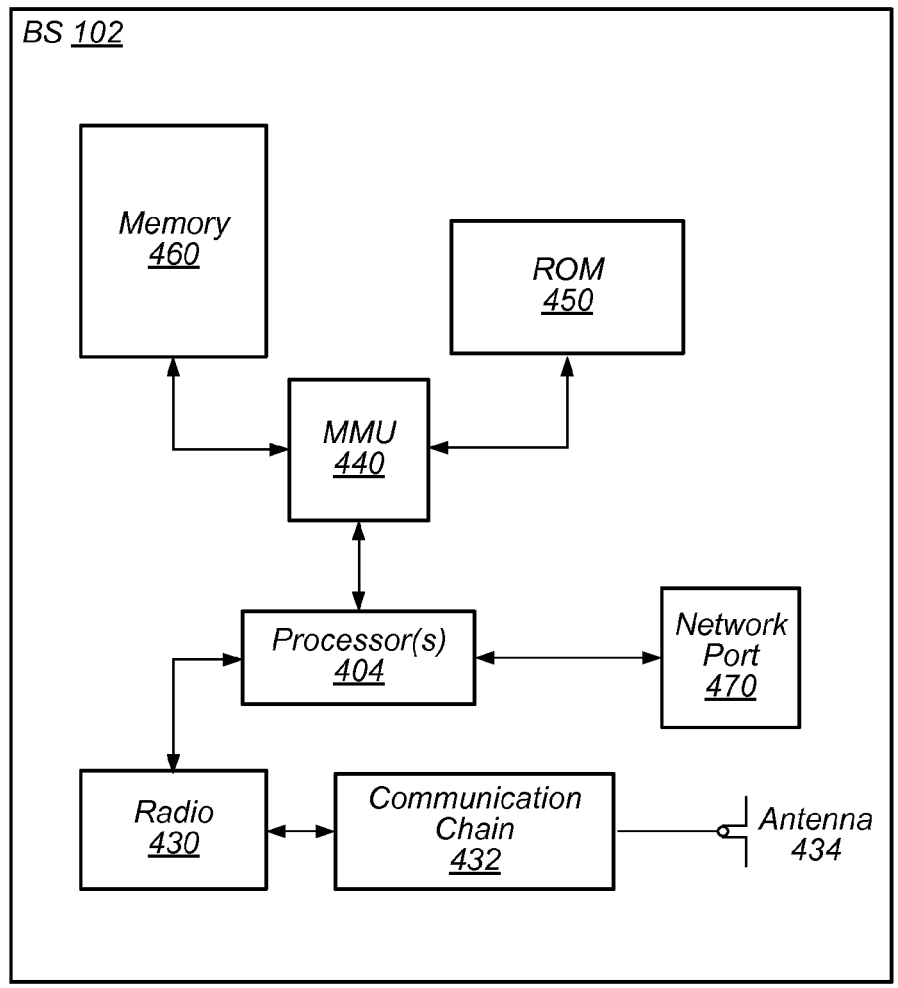
FIG. 4 illustrates an example of a base station, according to some embodiments.

FIG. 4—Base Station

FIG. 4 illustrates an example of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Dynamic Variation of Signal Processing Fidelity to Control Power Consumption

The fidelity requirements for the analog circuitry designed to support modern wireless communication standards are specified based on worst case and most demanding scenarios. However, the wireless environment is dynamic, and the percentage of time that the analog circuitry (e.g., RF circuity or analog baseband circuity) needs to deliver the best fidelity performance will be bounded. Significant power savings can be achieved by relaxing the fidelity requirements (and allowing so-called "dirty RF") on a dynamic basis or on demand, e.g., based on the waveform complexity and/or the amount of interference signal energy and/or the amount of undesired signal energy in the wireless medium. The adaptation of performance can be implemented, e.g., through dynamic sensing of the wireless environment or/and based on different use case scenarios. Power savings can be achieved both in transmit mode and receive mode.

The fidelity requirements for the analog circuitry may also be relaxed by employing digital signal processing (DSP) techniques to cancel the distortions resulting from analog imperfections (e.g., RF analog imperfections and/or baseband analog imperfections). If the effects of the analog impairments can be reduced by the DSP techniques, then RF parts that are cheaper and less power-demanding can be used to transmit and receive.

In addition to digital signal processing, a hybrid analog-digital method may be employed to control (e.g., decrease and/or increase) the fidelity of the received and/or transmitted waveforms as needed, and thus, reduce the average power consumed. A transmitted waveform is said to have high fidelity when it closely matches the ideal waveform that would be transmitted if all the analog components in the transmitter behaved in an ideal fashion (e.g., amplifiers were perfectly linear). A received waveform is said to have high processing fidelity when the RF/analog and digital processing causes no distortion on the received waveform, thus minimizing the probability of error.

Among other things, three mechanisms are presently disclosed: sensing and estimation, analog reconfiguration, and impairments/distortion cancellation.

Sensing and/or estimation of the presently-needed level of signal processing fidelity may be performed in the analog domain and/or in the digital domain. It may include power spectrum estimation in the analog domain and/or in the digital domain. It may also include demodulation of control channel elements in the received signal (to estimate the waveform modulation characteristics, and thus, the complexity and fidelity required from RF and DSP processing). In some embodiments, the user device may operate in the context of LTE, in which case the control channel elements (CCEs) may be included in the PDCCH (or the e-PDCCH) of a downlink subframe. However, in other embodiments, the user device may operate according to any of a variety of other wireless communication standards.

Cancellation of analog domain impairments and/or distortion may be performed in the digital domain and/or in the analog domain. In the digital domain, the UE device may cancel noise and/or distortions resulting from analog impairments and nonlinearities. The cancellation may take place after the introduction of the analog impairments and non-linearities. In the analog domain, compensation for distortions may be performed before the distortions are generated, e.g., by cancelling an interfering signal.

Figure 5:
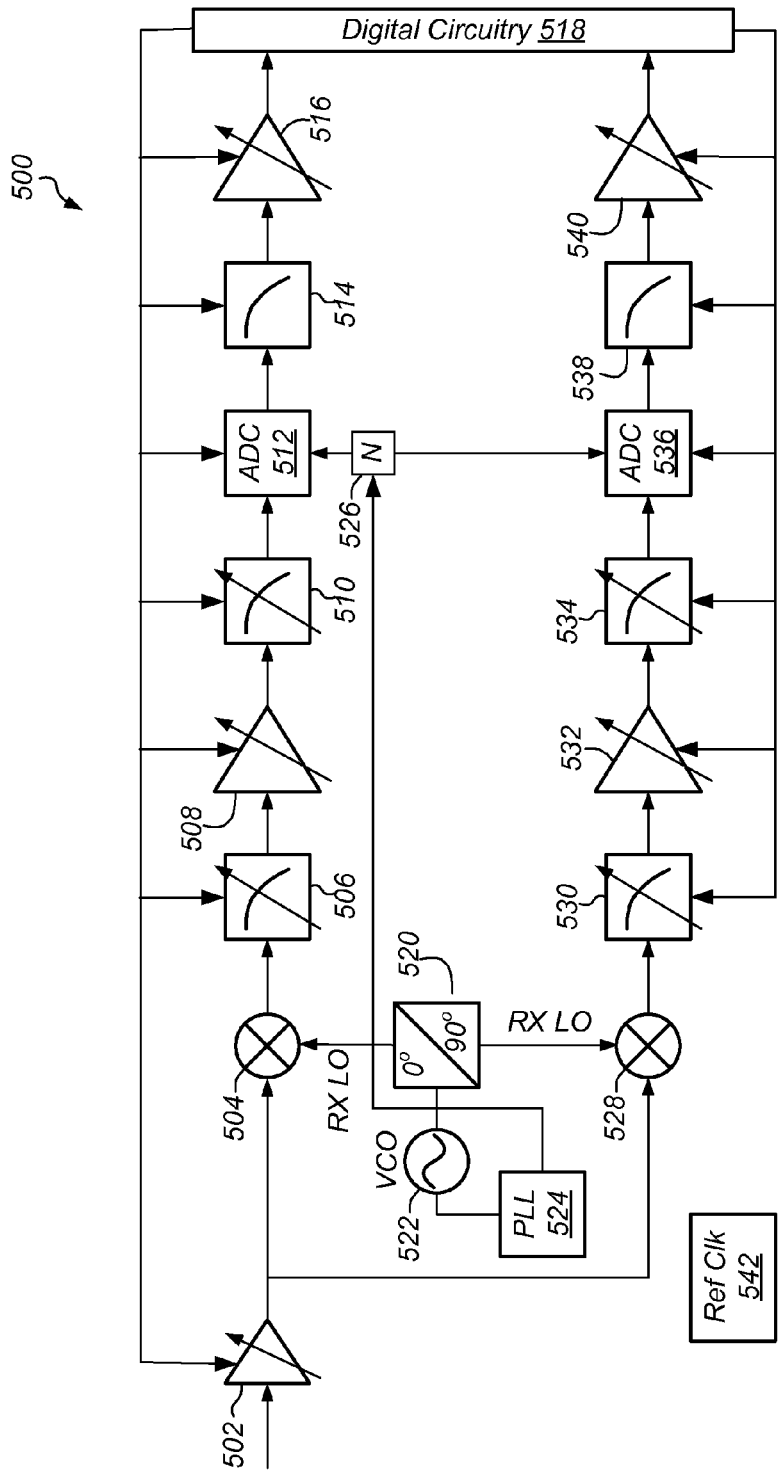
FIG. 5 illustrates an example of embodiment of a receiver 500, according to some embodiments.

For example, in one embodiment, the transmit (Tx) leakage RF waveform may be cancelled before inter-modulating with another interferer, e.g., at the input of the low noise amplifier (LNA). (In embodiments that employ Frequency Division Duplexing, the transmitter of the UE device may transmit while the receiver is receiving. Thus, the transmit signal may partially leak into the receive signal path.) In some embodiments, a receiver may be configured as shown in FIG. 5. The blocks shown in FIG. 5 may be implemented in one or more RF integrated circuits (RFICs). Each block may contribute distortion to the received signal, e.g., due to the block's nonlinearity and/or thermal noise.

FIG. 5 shows a receiver 500, according to some embodiments. The receiver 500 may be implemented in a UE device. The receiver may include a low noise amplifier 502 that receives an input signal (e.g., an input signal including a downlink OFDM signal transmitted by a base station). The gain of the LNA 502 may be controllable. The output of the LNA 502 may be supplied to the mixer 504 and mixer 528, which mix the amplified signal with orthogonal local oscillator (LO) signals supplied by frequency synthesizer 520. Frequency synthesizer 520 may generate the orthogonal LO signals based on an initial LO signal produced by voltage controlled oscillator 522 and PLL 524. (The orthogonal LO signals may be of the same frequency, but separated by 90 degrees in phase.) The mixer output signals may be supplied respectively to low-pass filters 506 and 530. These filters may be programmable. The filter output signals may be provided respectively to analog variable gain amplifiers (VGAs) 508 and 532. The amplifier output signals may be supplied respectively to low-pass filters 510 and 534. These filters may also be programmable. The outputs of filters 510 and 534 may be supplied respectively to analog-to-digital converters 512 and 536, which convert the filter output signals into respective sample sequences. The sample sequences produced by the ADCs are respectively filtered by filters 514 and 538. (Filters 514 and 538 may be FIR filters. FIR is an acronym for finite impulse response. However, other filter types may be used as well.) The output sequences produced by filters 514 and 538 may be supplied respectively to digital variable gain amplifiers (VGAs) 516 and 540. The output sequences produced by the digital VGAs may be supplied to digital circuitry 518 for IF and baseband processing. The digital circuitry 518 may be configured to demodulate and decode the output sequences from the digital VGAs in order to recover information carried by the downlink signal. The digital circuitry 518 may couple to any subset (or all) of the other units in the receiver to provide configuration parameters and/or control signals to those units, e.g., as shown in FIG. 5.

The sampling clocks of the ADCs may be supplied by unit 526. Unit 526 may divide the oscillator signal provided by PLL 524 by a factor N, where N is a positive integer. Thus, the frequency of the sampling clock may be 1/N times the frequency of the oscillator signal. The reference clock unit 542 may provide a reference clock signal to the PLL synthesizer 524 for implementing the RX LO waveforms.

On Demand Variation of Requirements for Receiver Analog Processing

Linearity on Demand: Received signals are typically weak, and need to be processed in the presence of strong adjacent channels.

The intermodulation requirements for the receiver (e.g., the linearity requirements imposed on the low noise amplifier (LNA), the mixer and the baseband circuitry) may be relaxed when the wireless spectrum is sensed as being free of interference. The linearity on demand may be configured based on one or more of the following factors (sensing):
  (a) the power of the in-band (IB) and out-of-band (OOB) wireless blockers;
  (b) the power of the transmit leakage (for FDD systems), of which an example is given below; and
  (c) the requirements on error vector magnitude (EVM), or more generally, the requirements on the operating demodulation SNR. SNR is an acronym for signal-to-noise ratio.

The power of in-band blockers may be determined by digital filtering after the ADC. For example, the difference in power between the input and output of the filter could determine the blocker power, wherein the passband of the filter is configured to pass the signal of interest. The power characteristics of the OOB blockers may be determined from a power spectrum meter in DSP by scanning the wireless spectrum outside the band of the downlink signal. The power of transmit leakage may be determined by either analog filters or filters in DSP. Such a filter may be tuned to pass the frequency of the transmit signal. (The leakage power may be measured based on the signal output from the filter.) The EVM requirements or the operating demodulation SNR may be determined based on decoding the control signal in the received signal, where the control signal dictates the modulation and coding scheme (MCS) of the modulated waveform.

The distortion can also be canceled in the digital domain with digital signal processing. In some embodiments, Second-Order Intermodulation Distortion (IMD2) may be adaptively cancelled, e.g., with a least mean squares (LMS) algorithm. Thus, a significant amount of hardware (HW) can be saved that would otherwise be dedicated for IIP2 calibration. Furthermore, in some embodiments, Third-Order Intermodulation Distortion (IMD3) may be cancelled, thus lowering the RF linearity requirements, and consequently, power consumption.

Example of IIP3 Savings

For band 5 of FDD LTE, the duplex spacing is 45 MHz. (Duplex Spacing means the spacing in frequency between transmit and receive.) A blocker at −90 MHz (relative to the center of desired RF signal), which can have a power of −15 dBm, will be attenuated by the duplexer of the UE device. (Let's assume a 35 dB attenuation from the Rx filter, resulting in continuous wave power $P_{CW}$=−50 dBm power. This Rx filter is also referred to as the duplexer bandpass filter.) The blocker may be due to another unwanted LTE channel and/or Tx leakage, which will intermodulate and produce distortion.

Figure 6:
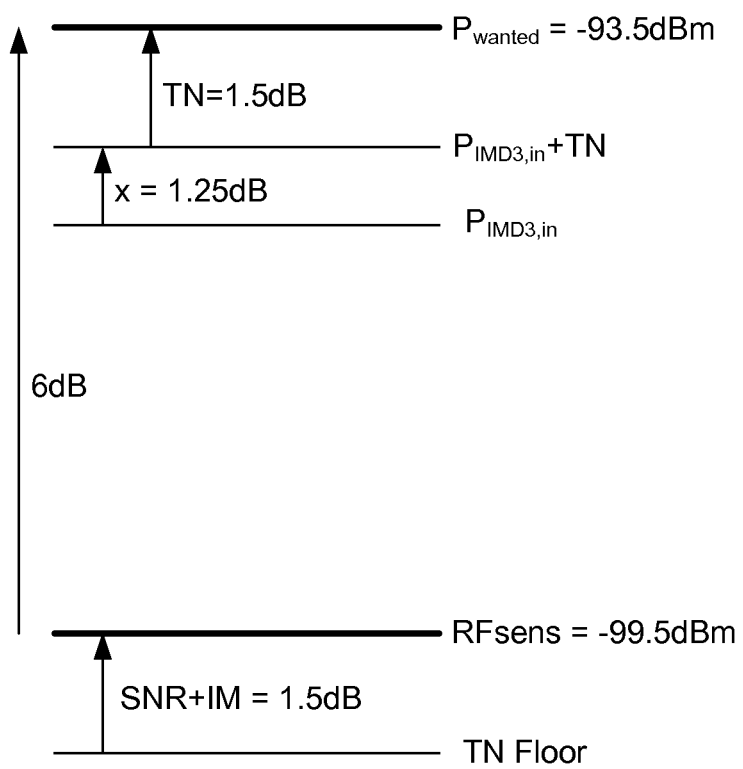
FIG. 6 illustrates an example of dimensioning the RF nonlinearity requirements, according to some embodiments.

Assume a receive signal with 5 MHz bandwidth and a transmit signal with 5 MHz bandwidth. Then for QPSK with coding rate 1/3, the maximum allowable distortion level due to IMD3 is:

$$P_{IMD3,in} = P_{wanted} - TN - x \quad (1A)$$

$$= -93.5 - 1.5 - 1.25 = -96.2 \, dBm, \quad (1B)$$

where $P_{wanted}$ is the desired power level of −93.5 dBm, according to the sensitivity of QPSK and coding rate 1/3 and allowing for the NF degradation due to blocker (6 dB). (NF is an acronym for noise figure.) TN represents thermal noise, and x represents the extra noise that TN will contribute relative to the intermodulation distortion, e.g., as shown in FIG. 6.

Assuming the maximum power of Tx is 23 dBm, and a duplexer loss of 2 dB, and a 50 dB isolation from the duplexer leakage, then the signal leakage of the transmit signal at the input of the receiver's LNA is:

$$P_{tx}=23+2-50-4=-29 \, dBm. \quad (2)$$

The factor of 4 dB accounts for a relaxation relative to the maximum Tx power, i.e., the actual Tx power could be 4 dB below the maximum Tx power. Thus, the required value of the third-order input intercept point (IIP3) in order to meet the Noise Figure (NF) degradation of 6 dB as dictated by the 3GPP standard is given by:

$$IIP3 = (2P_{tx} + P_{cw} - P_{IMD3,in})/2 \quad (3A)$$

$$= (2(-29) - 50 + 96.2)/2 \quad (3B)$$

$$= -5.9 \, dBm. \quad (3C)$$

This requirement is for QPSK (Quaternary Phase Shift Keying). As discussed, the 6 dB factor can be thought of as a NF degradation due to blocker. In FIG. 6, $RF_{sens}$ represents the sensitivity requirement for QPSK 1/3 in the absence of nonlinearities; SNR is the signal-to-noise ratio of the received signal due to thermal noise; IM represents implementation loss due to imperfect digital signal processing; and TN floor represents thermal noise floor.

Observe that for each 1 dB decrease in the Tx leakage power $P_{tx}$, the required value of IIP3 decreases by 1 dB. Thus, if the Tx leakage power is reduced by 10 dB, the IIP3 requirement can be reduced by 10 dB. Furthermore, for each 1 dB decrease in the blocker power $P_{CW}$, the required value of IIP3 decreases by 0.5 dB. Therefore, significant power saving could be achieved by filtering or canceling the leakage power.

IQ Mismatches in the Receiver

IQ mismatches in the receiver (Rx) will affect the fidelity of the received signal. IQ mismatches may include gain imbalance between the inphase (I) channel and the quadrature (Q) channel of the receiver, and/or, phase skew between the I channel and Q channel.

In a traditional architecture, additional cost may be incurred by employing calibration procedures to enable the estimation of the IQ mismatches. The mismatches may be frequency dependent as well, which will complicate the calibration procedure. There may be costs associated with calibration in the factory, especially since calibrations may be needed across many RFIC states/gains and receive bandwidths. Furthermore, there may be costs for calibration of analog filters; and costs for additional loopback circuitry in the RF processing. ("Loopback circuitry" refers to calibration-specific circuitry that involves looping back signals from various part of the RF chain to ADC circuitry, to extract the mismatches/distortions of interest.) The parameters determined during the calibration may be subsequently used by a digital compensation unit to remove the IQ mismatches.

In some embodiments, in order to avoid the costly calibrations, the receiver may employ a mechanism for adaptive and real time compensation of IQ mismatches (e.g., in OFDM signals, based on the power of the I and Q signals, as well as their cross-correlation). Frequency dependent mismatches may also be compensated with adaptive decorrelation techniques, e.g., in digital signal processing.

Different amounts of resource allocation (as is allowed in various communication standards such as LTE) and different modulation formats have different requirements for the maximum allowed IQ mismatches. For example, the maximum allowed IQ mismatch may be larger for a low-order constellation than for a high-order constellation. As another example, the maximum allowed IQ mismatch may larger if the UE device has been allocated a large number of resource blocks than when allocated a small number of resource blocks.

Therefore, in order to save power in digital processing, IQ impairment compensation (e.g., crosstalk compensation) may be adaptively engaged based on one or more of the following factors.

(A) Order of modulation and/or modulation and coding scheme (MCS), and spatial dimension. For example, IQ impairment compensation may be engaged when 64QAM is being used and not engaged when QPSK is being used. As another example, IQ impairment compensation may be engaged when MIMO rank is greater than one and not engaged when MIMO rank is equal to one. (MIMO with rank>>1 may require greater SNR compared to MIMO with smaller rank or rank=1.)

(B) One-sided versus two-sided allocation. In case of a one-sided allocation, the power of the image frequency may determine when IQ compensation is activated. (The image frequency is the negative of the frequency that is allocated to the receiver. Another user may be allocated resources at the image frequency.) Digital circuitry in the UE device may measure the image frequency power, and decide if IQ compensation is needed based on the measurement. If the power at frequency f and the power at image frequency −f are substantially different, e.g., if the absolute value of their ratio deviates from unity by more than a given amount (i.e., the power at f is substantially larger than the power at −f), then IQ impairment compensation may not be engaged at least for frequency f.

(C) The image rejection ratio (IRR) is given by:

$$IIR = \frac{1 + 2g\cos(\varphi) + g^2}{1 - 2g\cos(\varphi) + g^2},\quad(4)$$

where g is the gain mismatch and φ is the phase mismatch. For a numerical example, if a signal-to-noise ratio (SNR) of 10 dB is required for demodulating a waveform with a particular BLER (block error rate), then no compensation is required if the gain mismatch is less than 20% and phase mismatch is less than 20 degrees, as it can be verified by the above equation. (In other words, under those conditions on gain mismatch and phase mismatch, it follows that $10*\log_{10}$(IIR) is greater than 10 dB.) More generally, digital circuitry in the UE device may: compute gain mismatch g and phase mismatch φ based on the I and Q components of the received signal; compute the IIR based on the above formula; compare the computed IIR (or its decibel equivalent) to a required SNR; and enable IQ compensation if the computed IIR is less than the required SNR.

Digital circuitry in the UE device may also measure the image frequency power, and decide if IQ compensation is needed based on the measurement of the image frequency power (The digital circuitry may implement an AGC function in order to control the gain of one or more amplifiers, filters, etc. in the receiver. AGC is an acronym for Automatic Gain Control. Among the operations of the AGC may be the operation of measuring power for any given frequency or range of frequencies. Thus, the above-mentioned measurement of the image frequency power may be performed as part of the digital AGC function.) For example, if there is no allocation at the image frequency, no IQ compensation is needed.

(D) A higher frequency allocation will be more sensitive to frequency-dependent IQ mismatches than a lower frequency allocation. This is because delay mismatches between the I and Q processing paths will result in larger phase mismatches at higher frequencies. In other words, the UE device will be more sensitive to IQ mismatches when resources allocated to the UE device are at the high-frequency end of the downlink spectrum than when resources are allocated at the low-frequency end of the downlink spectrum. Therefore, the UE device may enable/disable compensation of frequency-dependent IQ mismatches based on the location of its resource allocation(s) in the frequency domain. The base station may indicate the resources that are allocated to the UE device in a control channel (e.g., the PDCCH or the e-PDCCH) of the downlink signal.

Phase Noise in the Receiver

Phase noise can affect the receiver through: (1) self interference of the desired signal, and/or (2) spectral broadening of adjacent channels which are stronger than the desired signal. (An adjacent channel is a channel that is adjacent to the channel on which the currently serving base station is transmitting to the UE device.) Phase noise may be caused by imperfections of the local oscillator (LO) of the PLL circuitry.

Relaxing the phase noise requirements, i.e., increasing the maximum allowed phase noise power, will result in significant reductions in the power consumed by the phase-locked loop (PLL). The relaxation of PLL phase noise requirement may be achieved based on spectrum sensing and/or the use case. In the spectrum sensing method, digital circuitry in the UE device may sense the power of adjacent channels (that could contribute to reciprocal mixing), and relax (tighten) the phase noise requirement when the adjacent channel power is small (large). In the use case method, the digital circuitry in the UE device may impose different requirements on the phase noise for different use cases (e.g., modulation schemes and/or modulation orders and/or numbers of spatial streams). A small (large) modulation order and small (large) number of spatial streams would correspond to a loose (tight) constraint on phase noise, since the SNR requirements are different.

In some embodiments, the relaxation of the constraint on the power spectral density (PSD) of the PLL phase noise may be enabled by the use of digital signal processing techniques to compensate for the phase noise in the digital baseband signal. The low-frequency components of the phase noise will result in random phase rotation per symbol. These low-frequency components of the phase noise can be tracked (and thus, removed) through one or more of the following techniques.

(1) Common Phase Error estimation and correction. Common phase error is a common phase rotation that every subcarrier experiences for a particular OFDM symbol. Common (same) phase error may be estimated by use of channel estimation techniques. Common phase error may be corrected by de-rotating the subcarriers for each OFDM symbol by the estimated CPE (common phase error).

(2) Operation of an automatic frequency control (AFC) loop. Digital circuitry of the UE device may implement the AFC loop by estimating the phase jumps from one OFDM symbol to the next. (Each subcarrier will have a random phase component, which varies from one OFDM symbol to the next. The digital circuitry may compensate for these phase jumps.)

(3) Channel estimation and tracking across time. (Channel estimates may be generated by the UE based on pilot symbols or reference symbols embedded by the base station in the downlink signal.) In case of channel estimation with Kalman filtering, the frequencies of the phase noise PSD profile that can be tracked (and thus, removed) may be determined by solving a steady state Lyapunov equation. The steady state Lyapunov equation may be determined from a state-space dynamic model of the channel power delay profile, which is a function of the Doppler shift. The high frequency components of phase noise (which introduce ICI) may be canceled through an adaptive ICI cancellation scheme. (ICI is an acronym for Inter-Carrier Interference. PSD is an acronym for Power Spectral Density.)

Baseband Analog Filtering

The power consumed by the baseband analog filter (e.g., filter 510 and filter 534 of FIG. 5) of the receiver may be proportional to the dynamic range of the total input signal (i.e., the desired signal plus any strong blockers) to the filter as well as the bandwidth BW of the desired signal and the number of poles in the transfer function of the filter. The term "desired signal" refers to the signal corresponding to the UE's resource allocation. The term "blocker" refers to an interfering signal. The number of poles will determine the amount of attenuation of the blockers.

Digital circuitry in the UE device may dynamically sense the power of adjacent blockers. (A blocker is said to be "adjacent" when it is located next to the desired signal in frequency.) Relying on the dynamically sensed power of the adjacent blockers, the digital circuitry may adjust the analog filter circuitry using one or more of the following techniques.

(A) The number of transfer function poles may be reduced when the power of the adjacent blockers is small (e.g., less than a threshold value), thus reducing the number of stages in the baseband analog filter.

(B) The dynamic range of the analog processing path of the analog filter may be reduced when the power of the adjacent blockers is small. For example, the dynamic range of the analog processing path may be reduced by reducing the number of ADC bits. Reduction of dynamic range reduces clipping or compression induced nonlinearities due to the presence of strong signals.

(C) The analog filter circuitry may be allowed to become noisier (e.g., by operating the analog filter circuitry at a lower supply current level or lower supply power level) based on the input signal power. (The AGC can determine the strength of the incoming desired signal. If the signal is strong, more noise can be tolerated. Thus, the analog blocks are allowed to become noisier. If the signal is small, then the analog blocks are required to be less noisy.)

(D) The bandwidth of the filter may be adjusted based on the size of the resource allocation to the UE device. (LTE allows dynamically variable size allocations to users.) For a smaller number of allocated resource blocks (RBs), the UE device may use a smaller filter bandwidth, and thus, consume less power. The UE device may place the center the filter's pass band at the center of the allocation, i.e., the set of resource blocks allocated to the UE device.

Example of a First-Order Analog Filter

Figure 7A:
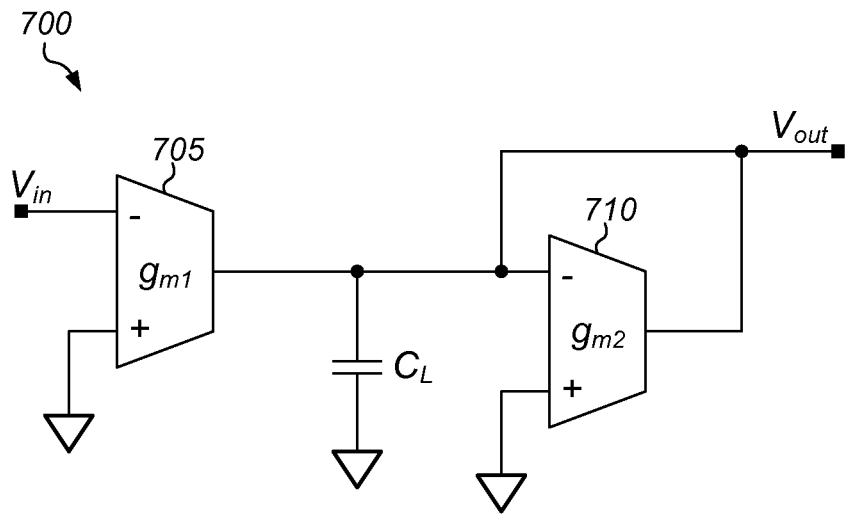
FIG. 7A illustrates an example of a single-ended first order analog filter, according to some embodiments.

FIG. 7A illustrates a single-ended first order filter 700, according to some embodiments. (Filter 700 may be used to implement the above-described baseband analog filter, or a portion thereof) The filter 700 may include a transconductor 705 with transconductance value $g_{m1}$, a capacitor $C_L$, and a transconductor 710 with transconductance value $g_{m2}$. An input voltage $V_{in}$ may be supplied to a negative input of the transconductor 705. The positive input of the transconductor 705 may be coupled to ground. The output of the transconductor 705 may be coupled to the negative input of the transconductor 710, to capacitor $C_L$, and to an ouput port $V_{out}$ of the filter 700.

Figure 7B:
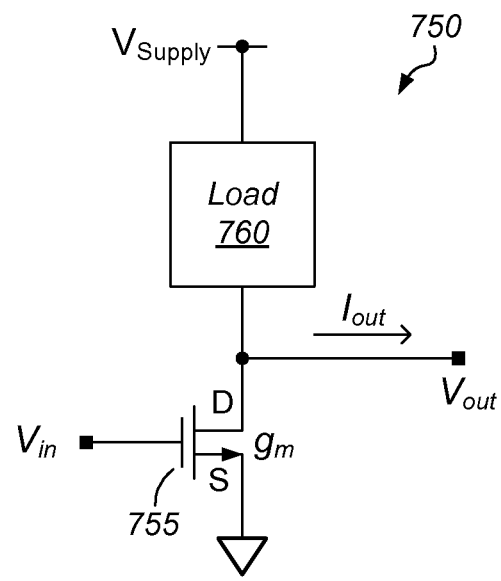
FIG. 7B illustrates an example of a transconductor circuit, according to some embodiments.

In some embodiments, each of transconductor 705 and transconductor 710 may be implemented as shown in FIG. 7B, which illustrates a transconductor circuit diagram 750. (However, it should be understood that there is no general requirement that transconductors 705 and 710 be realized by identical circuitry.) An input voltage signal $V_{in}$ may couple to the gate of a transistor 755 of transconductance value $g_m$. The drain D of the transistor may couple to a supply voltage $V_{Supply}$ through a load 760. (The load may be, e.g., a resistor.) The source S of the transistor may couple to ground. A current $I_{out}$ and voltage $V_{out}$ is produced at the output port (which is coupled to the drain).

Definition of Dynamic Range or Signal-to-Noise Ratio

Referring to FIG. 7A, the transfer function of the filter 400 may be expressed as:

$$H(s) = \frac{-g_{m1}}{sC_L + g_{m2}} = \frac{-g_{m1}/g_{m2}}{1 + \frac{s}{g_{m2}/C_L}} \quad (5A)$$

$$= \frac{-A_{v0}}{1 + s/p_1}, \quad (5B)$$

where pole $p_1 = g_{m2}/C_L$, where s is a complex variable.

According to [Rajavi], the drain noise current is given by $$i_{totn}^2 = i_{dn1}^2 + i_{dn2}^2 = 4kT\gamma(g_{m1} + g_{m2})B_n, \quad (6)$$

where k represents Boltzmann's constant, T represents the temperature of observation, y represents a factor depending on the transistor geometry, $i_{dn1}$ represents the noise current of stage 1, $i_{dn2}$ represents the noise current of stage 2. The noise equivalent bandwidth $B_n$ of the circuit is given by $$B_n = p_1/4 = g_{m2}/(4C_L). \quad (7)$$

[Rajavi] refers to the book entitled, "RF Microelectronics", by Behzad Rajavi.

Assume a full-scale signal voltage (i.e., peak-to-peak voltage) at the output of the filter denoted $V_{FS,pp}$. Assume also a high impedance from the load. Thus, we have the total noise voltage squared given by $$v_{totn}^2 = \frac{i_{totn}^2}{g_{m2}^2}. \quad (8)$$

Power Consumption Model

A power consumption model for the above-described amplifier 700 as a function of gain, bandwidth (BW) and signal-to-noise ratio (S/N) may be constructed as follows. By substituting the expressions for $i_{totn}^2$ and $B_n$ into the above expression for $v_{totn}^2$, we obtain $$v_{totn}^2 = \frac{i_{totn}^2}{g_{m2}^2} = 4kT\gamma\frac{g_{m1} + g_{m2}}{g_{m2}^2}\left(\frac{g_{m2}}{4C_L}\right) \quad (9A)$$

$$= \frac{kT}{C_L}\gamma\frac{g_{m1} + g_{m2}}{g_{m2}} = \frac{kT}{C_L}\gamma(1 + A_{v0}). \quad (9B)$$

By assuming full-swing at the output, the dynamic range (i.e., S/N) at the output of the filter is:

$$D = (S/N) = \frac{v_s^2}{v_{totn}^2} = \frac{v_{FS}^2/8}{kT\gamma(1 + A_{v0}/C_L)} \quad (10A)$$

$$= \frac{V_{FS}^2 g_{m2}}{8kT\gamma(1 + A_{v0})p_1}, \quad (10B)$$

where $v_S$ denotes the voltage of the desired or useful signal.

The total current $I_D$ from the two-branches is:

$$I_D = g_{m1}V_{eff} + g_{m2}V_{eff} \quad (11A)$$

$$= (1 + A_{v0})g_{m2}V_{eff} \quad (11B)$$

$$= 8kT\gamma(1 + A_{v0})^2\frac{V_{eff}}{V_{FS}^2}p_1 D, \quad (11C)$$

where $V_{eff}$ denotes $V_{GS} - V_{th}$.

For a classical long channel MOSFET, the transconductance $g_m$ is given by $$g_m = \frac{2I_D}{V_{GS} - V_{TH}} = \frac{I_D}{V_{\mathit{eff}}}, \tag{12}$$

where $V_{GS}$ denotes the voltage between the gate and source of the MOSFET, $V_{TH}$ denotes the turn on threshold voltage.

The power consumption of the example amplifier is therefore:

$$P = V_{DD} I_D \tag{13A}$$

$$= 8kT\gamma(1 + A_{v0})^2 \frac{V_{\mathit{eff}}}{\eta V_{FS}} p_1(S/N), \tag{13B}$$

where $V_{DD}$ represents the supply voltage.

Ideally, the maximum output voltage swing $V_{FS}$ would be equal to power supply voltage $V_{DD}$. If this is not the case, the power consumption will increase by $$\eta = V_{FS}/V_{DD}. \tag{14}$$

We observe that, with a higher filter bandwidth, more noise will be integrated and more power needs to be consumed to maintain the dynamic range (i.e., SNR). Filter bandwidth is represented in the above equation by the pole p1.

As an example in the case where blocker power dominates, if the detected blocker power decreases by 10 dB, power consumption P can be decreased by 10 dB at the expense of a 10 dB decrease in dynamic range (S/N). See equation (13B).

Also, if the bandwidth (BW) of the downlink allocation to the UE device decreases (e.g., from 50 RBs to 2 RBs), for the same dynamic range the UE device can tradeoff 14 dB of bandwidth (less integrated noise) and reduce the power consumption. (Note that 10*log(50/2)≈14.) In other words, power consumption P can be reduced by reducing the filter bandwidth to agree with the reduced allocation bandwidth. In equation (13B), bandwidth is represented by parameter $p_1$.

ADC and Dynamic Range on Demand

The specifications for the analog-to-digital converter (ADC) of the UE's receiver may include the channel bandwidth (BW) and dynamic range. Therefore, in some embodiments, the model for power consumption of the ADC is:

$$P \sim \text{DynamicRange} \times BW. \tag{15}$$

BW represents the channel bandwidth, i.e., the bandwidth of the radio channel (e.g., the OFDM band) carrying the UE's desired signal.

The dynamic range of the ADC may be dynamically adjusted based on one or more of the following factors.

(A) The dynamic range may be dynamically adjusted based on the bandwidth of the desired signal, which is typically much smaller than the channel bandwidth. (In LTE, the allocation of resources is dynamic. Thus, the bandwidth of the resources allocated to the UE device may vary dynamically.) Imagine two allocations having equal power but different BWs and the same SNR requirements: BW1>BW2. The dynamic range of the ADC for allocation 2 would be larger (than for allocation 1) since the integrated quantization noise (QN) would be smaller. Thus, the ADC would expend unnecessary power for allocation 2. Therefore, power consumption P could be reduced by reducing the dynamic range of the ADC when allocation bandwidth decreases. The UE device may control the dynamic range of the ADC by controlling one or more of the sampling frequency, number of quantizer bits and number of ADC stages.

(B) The power levels of blockers may also be used to determine the required dynamic range. The power levels of blockers may be sensed dynamically, and thus, the dynamic range may be adjusted dynamically. The dynamic range may be increased (decreased) when the blocker power level is small (large). The power levels of blockers may be sensed by AGC circuitry and/or by filtering in digital domain.

(C) Operating parameters such as the modulation-and-coding scheme (MCS) and the number spatial streams may determine the SNR requirement imposed on the ADC. (An SNR requirement may be imposed on the ADC by controlling the dynamic range of the ADC.) In other words, the SNR requirement (or ADC bandwidth) may be adjusted based on the MCS of the allocation and/or the number of spatial streams associated with the allocation. The base station may signal the MCS of the allocation and/or the number spatial streams in the control channel.

The dynamic range of the ADC may be dynamically adjusted by controlling one or more of the following.

(1) The clock frequency of the ADC. Quantization Noise (QN) is spread to a smaller range of frequencies when the clock frequency is smaller. Thus, dynamic range decreases when the clock frequency is decreased.

(2) The order of the sigma-delta modulator of the ADC. Lower order implies less noise shaping, higher quantization noise, and thus, a decrease in dynamic range.

(3) The number of ADC quantizer (comparator) bits that feed the DAC in the case of a Sigma-Delta ADC.

The QN transfer function used for noise shaping may also be configured to have zeros on the interval(s) of frequencies corresponding to the allocated RBs (analogous to a bandpass transfer function optimized for the allocated RBs). If we place the zeros of the sigma delta transfer function around DC (i.e., zero frequency) of the downlink ODFM channel in a static way, the ADC wastes effort when the UE's resource allocation is close to the channel edge. (The sigma-delta transfer function is also referred to herein as the QN transfer function.) The shaping is not optimal at these frequencies.

For example, consider a sigma-delta modulator with n integrators, with B bits in the quantizer, and with oversampling ratio equal to OSR. The SNR from quantization noise (QN) in such a signal-delta modulator may be expressed as:

$$SNR = \frac{3\pi}{2}(2^B - 1)^2 (2n + 1)\left(\frac{OSR}{\pi}\right)^{2n+1}. \tag{16}$$

For example, if the desired demodulation SNR=5 dB, then in the absence of blockers, the dynamic range DR required from (16) would be $$DR = SNR + 10\ dB + PAPR + Fading \approx 35\ dB, \tag{17}$$

where PAPR is the peak-to-average power ratio, and Fading represents the fading margin (up-fades and down-fades). This requirement could be met, e.g., by OSR=10, n=2, B=2.

In case of the highest MCS and in the presence of blockers, the required DR=70 dB. This requirement could be met, e.g., by OSR=20, n=3, B=3.

Thus, we see that significant ADC power saving could be achieved by lowering the requirements for dynamic range of the ADC.

Transmit Datapath and Power Amplifier Distortion

Similar to the above-described digital signal processing techniques in the receiver of the UE device, digital processing may be used to control the transmitter of the UE device, to optimize the consumed power in a dynamic fashion.

In some embodiments, digital predistortion (DPD) circuitry and envelope tracking (ET) look up tables in the transmitter may be dynamically adjusted based on one or more factors such as the uplink modulation scheme, EVM requirements, and the size and location of the RB allocation. (EVM is an acronym for Error Vector Magnitude.)

As discussed above for the receiver, the impairments of the transmitter (e.g., the IQ mismatches and/or frequency-dependent IQ mismatches, phase noise, etc.) may be adjusted dynamically based on the required fidelity of the transmitted waveform.

Figure 8:
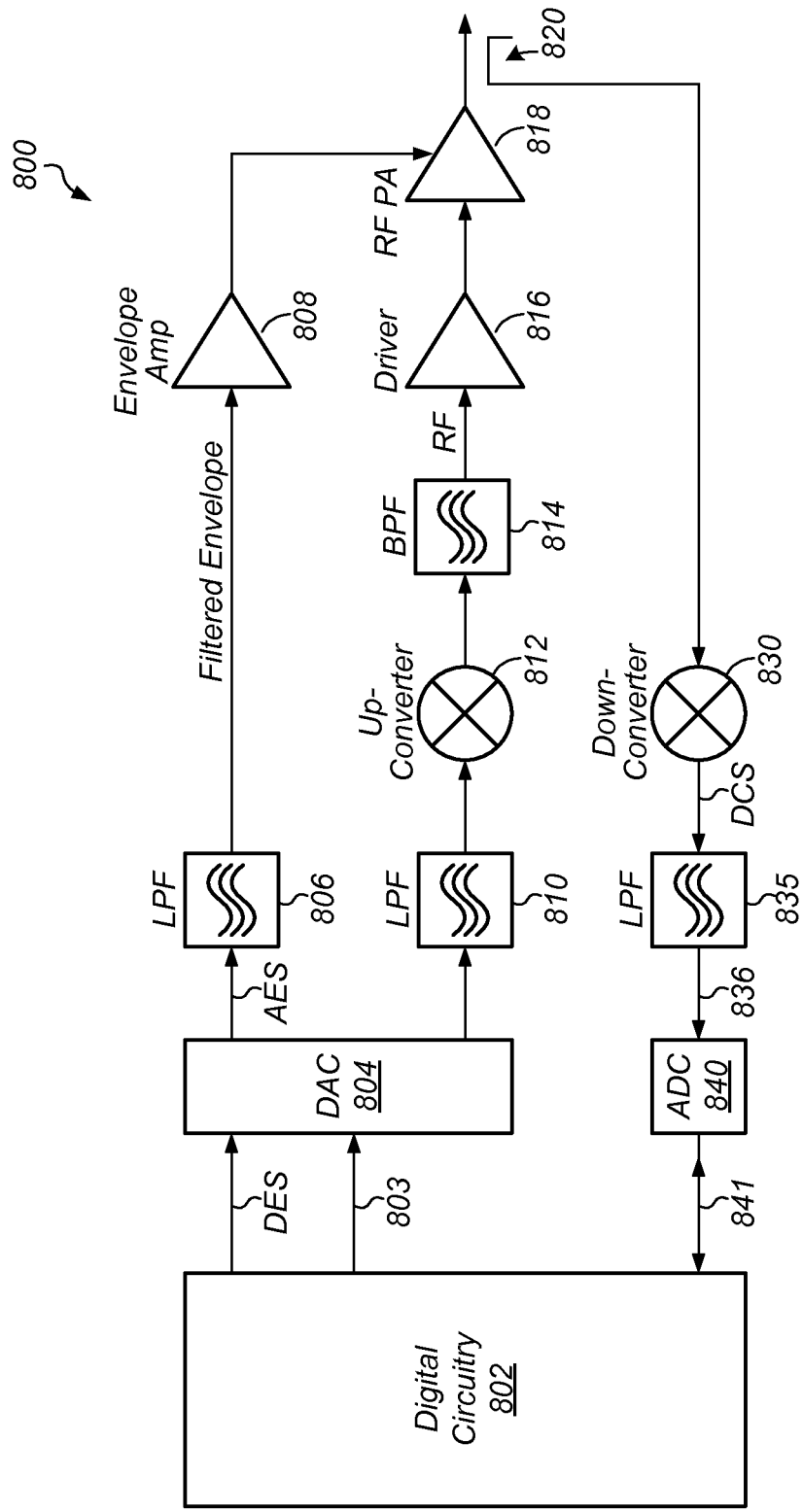
FIG. 8 illustrates an example of a transceiver 800, according to some embodiments.

FIG. 8 illustrates a transceiver 800, according to some embodiments. The transceiver 800 may be used by the UE device. Digital circuitry 802 (e.g., a digital signal processor, or an ASIC, or a programmable hardware element, or any combination of the foregoing) may be configured to perform one or more functions such as:
  generation of a digital baseband signal;
  scaling and/or detroughing of the amplitude baseband signal;
  predistortion of the digital baseband signal to compensate for impairments to be introduced by the transmitter; and
  time alignment of the amplitude signal with respect to the phase signal.

In some embodiments, the amplitude signal and the phase signal refer respectively to the amplitude $A(n)$ and the phase $\theta(n)$ in the complex representation $A(n)*\exp\{j*\theta(n)\}$ of the baseband signal.

The predistorted digital baseband signal 803 is supplied to digital-to-analog converter (DAC) 804, which converts the predistorted digital baseband signal to an analog signal. The analog signal is low-pass filter by filter 810, and the low-pass filtered signal is up-converted by up-conversion unit 812. The up-converted signal is band-pass filtered by filter 814. The RF signal generated by filter 814 is supplied to driver 816, which pre-amplifies the signal. The output signal from the driver is amplified by RF power amplifier 818 in order to generate an output signal, which is transmitted via one or more antennas of the UE device.

Digital circuitry 802 may also supply a digital envelope signal DES to the DAC 804, which converts the digital envelope signal into an analog envelope signal AES. The analog envelope signal may be low-pass filtered by filter 806 to generate a filtered envelope signal, which is amplified by envelope amplifier 808. The output of the envelope amplifier may be used to control the power supply voltage of the power amplifier 818. By continuously adjusting the power supply voltage, the efficiency of the power amplifier may be increased (i.e., less power may be wasted due to thermal dissipation).

The transceiver 800 may also include a down-converter 830 that down-converts an input signal received from the RF coupler 820. The coupler is configured to couple back the transmitted waveform in order to analyze its distortion characteristics. The down-converted signal DCS is low-pass filtered by filter 835. The low-pass filtered signal 836 is sampled by analog-to-digital converter 840. The resultant sampled signal 841 is supplied to digital circuitry 802 for processing. The down-conversion path provides a feedback loop, e.g., to enable training of the predistortion circuitry.

The digital circuitry 802 may be configured to supply configuration parameters and/or control signals to analog circuits such as low pass filters 806, 810, 835, upconverter 812, downconverter 830, amplifier 808, driver 816, power amplifier 818, or any subset of the foregoing. Furthermore, the digital circuitry 802 may be configured to supply configuration parameters and/or control signals to DAC 804 and/or ADC 840. These configuration parameters and/or control signals may be a function of the target power consumption as well as the required fidelity of the Tx waveform. The required fidelity could be determined from decoding the control channel in the downlink signal (e.g., the PDCCH in the context of LTE).

Figure 9:
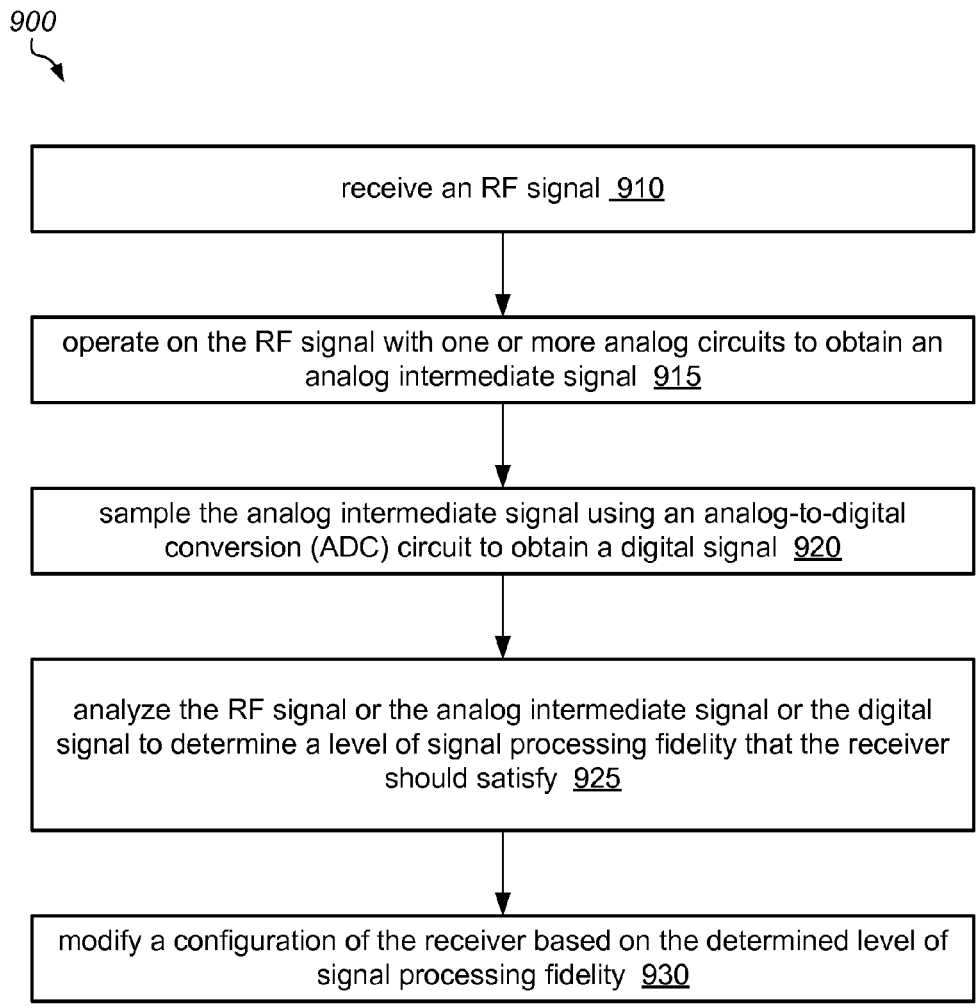
FIG. 9 illustrates a method for operating a receiver, according to some embodiments.

In one set of embodiments, a method 900 for operating a wireless receiver may include the operations shown in FIG. 9. (The method 900 may also include any subset of the features, elements and embodiments described above.) The wireless receiver may be part of a UE device, e.g., as variously described above. In some embodiments, the UE device may be a power limited device such as a wearable device.

At 910, an RF signal is received using one or more antennas of the UE device. The RF signal may be received from a transmission medium in response to a downlink transmission from a serving base station, e.g., an LTE eNodeB. (In some embodiments, the RF signal is or includes an OFDM signal or an OFDMA signal.) The RF signal may include one or more sources of interference, e.g., transmissions of the base station on other channels or other portions of a channel, transmissions of other base stations, transmissions of the UE device, etc. The interference environment may vary dynamically. Furthermore, the size and/or location of resource allocations to the UE device may vary dynamically within the downlink channel spectrum.

At 915, the UE device may operate on the RF signal with one or more analog circuits to obtain an analog intermediate signal. For example, the analog circuits may include mixers, filters, amplifiers, etc. (FIG. 5 shows one embodiment of the analog circuits. However, a wide variety of other embodiments are possible.) The analog intermediate signal may be a complex signal including inphase and quadrature component signals.

At 920, the analog intermediate signal may be sampled using an analog-to-digital conversion (ADC) circuit, to obtain a digital signal, i.e., a sampled signal. In some embodiments, the sampled signal may be a complex-valued signal having inphase and quadrature component signals. Thus, the ADC circuit may be a two-channel device.

At 925, the UE device analyzes the RF signal or the analog intermediate signal or the digital signal (or, any combination of those signals) to determine a level or a set of levels of signal processing fidelity that the receiver should satisfy. (For example, the UE device may include digital circuitry to analyze the digital signal, or analog circuitry to analyze the RF signal and/or the analog intermediate signal.) In some embodiments, if the analyzed signal(s) is of high quality (e.g., has signal-to-noise ratio above a given threshold or has interference power less than a given threshold), then the level (or set of levels) of signal processing fidelity demanded of the analog circuits (or a subset thereof) may be relaxed, e.g., relaxed relative to a default level specified by a wireless communication standard (such as LTE, Wi-Fi or WiMax or Bluetooth).

The level(s) of signal processing fidelity may be expressed in different ways in different embodiments, and/or, for different ones of the analog circuits. For example, the level of signal processing fidelity may be expressed in terms of a maximum allowed amount of distortion or non-linearity specifications or error vector magnitude. As another example, the level of signal processing fidelity may be expressed in terms of a minimum allowed value of degradation to the signal-to-noise ratio, etc.

At 930, the UE device may modify a configuration of the receiver based on the determined level of signal processing fidelity, e.g., as variously described above. The action of modifying the receiver configuration may include one or more of the following. (1) The modification may include adjusting a level of analog processing fidelity of at least one of the one or more analog circuits. (2) The modification may include processing the digital signal using one or more digital circuits to correct analog-domain distortions introduced by the one or more analog circuits.

The received RF signal may include a downlink signal transmitted by a serving base station (on a downlink channel, e.g., an OFDM signal spectrum) and one or more interfering signals. The downlink signal may include information for reception by the wireless receiver. The interfering signals may include other downlink signals transmitted on other channels or other portions of a channel (not intended for the UE device) and/or leakage of the uplink signal transmitted by the UE device.

In some embodiments, the above-described actions of analyzing and modifying may be performed dynamically while the RF signal is being received.

In some embodiments, the above-described actions of analyzing and modifying are performed continuously and/or repetitively in order to respond to dynamic changes in RF signal environment. The level of signal processing fidelity may be relaxed when the RF signal environment is relatively free from interference, and tightened when the RF signal environment has a large amount of interference.

In some embodiments, the action of adjusting the level of analog processing fidelity includes adjusting an extent of linearity of the at least one analog circuit. The analog circuits may include, e.g., any combination of the following: a low noise amplifier (LNA), one or more mixers, one or more intermediate-frequency circuit elements, voltage amplifiers, frequency synthesizers, power amplifiers, analog filters, one or more baseband circuit elements.

In some embodiments, the action of adjusting the level of analog processing fidelity includes reducing (or more generally, adjusting) a nonlinearity measure (such as IIP3) of the at least one analog circuit.

In some embodiments, the action of processing the digital signal includes one or more of the following:
(a) removing IQ mismatches caused by the one or more analog circuits from the digital signal;
(b) removing phase noise present in the digital signal using common phase error estimation and correction algorithms;
(c) at least partially removing phase noise present in the digital signal by activating an automatic frequency control (AFC) loop;
(d) at least partially removing phase noise present in the digital signal by performing repeated channel estimation over time and/or tracking evolution of the channel estimate;
(e) removing high frequency components of phase noise in the digital signal using an adaptive intercarrier interference (ICI) cancellation algorithm;
(f) removing transmitter leakage present in the digital signal (i.e., leakage from the transmitter of the UE device);
(g) removing second order intermodulation distortion (IMD2) from the digital signal (e.g., using an Least Mean Squares algorithm);
(h) removing third order Intermodulation Distortion (IMD3) from the digital signal (e.g., using an LMS algorithm).

In some embodiments, the action of modifying receiver configuration includes activating an analog pre-compensation circuit configured to remove transmitter leakage from the RF signal prior to the one or more analog circuits, e.g., prior to the low noise amplifier 502 of FIG. 5.

In some embodiments, the at least one analog circuit includes an analog filter, e.g., as variously described above. In these embodiments, the action of adjusting the level of analog processing fidelity may include one or more of the following: (1) adjusting the number of poles of the analog filter; (2) adjusting dynamic range of the analog filter; (3) adjusting the extent of clipping or compression of the analog filter; (4) operating the analog filter with lower supply power; (5) adjusting a bandwidth of a passband of the analog filter; (6) adjusting a center frequency of a transfer function (or passband) of the analog filter.

In some embodiments, the at least one analog circuit includes an analog filter. In these embodiments, the analyzing operation 925 may include analyzing a wireless spectrum of the RF signal. The action of adjusting the level of analog processing fidelity may include dynamically adjusting an extent of linearity of the analog filter, e.g., based on: (a) results of said analyzing the wireless spectrum, and (b) the determined level of signal processing fidelity that the receiver should satisfy.

In some embodiments, the analyzing operation 925 determines: interference power in the RF signal; and/or bandwidth of a receive signal in the RF signal. The action of modifying the receiver configuration may be based on one or more of the following: (a) the determined interference power, (b) the determined bandwidth and (c) the determined level of signal processing fidelity that the receiver should satisfy.

In some embodiments, the action of modifying the receiver configuration may include adjusting one or more performance parameters of the ADC circuit of the receiver. For example, the modification may include adjusting: clock frequency of the ADC; order of the $\Sigma$-$\Delta$ modulator of the ADC; the number of ADC flash bits that feed the ADC; or any combination of the foregoing. As another example, the quantization noise transfer function of the ADC may be configured to have zeros in or near the interval of the frequencies allocated to the receiver within the downlink channel.

In some embodiments, the analyzing operation 925 includes one or more of the following:
(a) determining power of an in-band (IB) spectrum and power of an out-of-band (OOB) spectrum of the RF signal;
(b) determining power of transmit leakage in the receiver;
(c) recovering a message encoded in the RF signal, wherein the message has been embedded in the RF signal by a remote transmitter of the RF signal, wherein the message indicates the level of signal processing fidelity;
(d) recovering an indicator of a current modulation and coding scheme (MCS) or modulation order from a portion of the RF signal;
(e) measuring the power of channels (or channel portions) adjacent to the UE's downlink allocation;
(f) determining a number of resource blocks or bandwidth allocated to the receiver in the RF signals;
(g) determining power levels of blockers in the RF signal;
(h) determining position of resource blocks allocated to the receiver with a frequency band of the RF signal;
(i) determining a number of spatial streams carried in the RF signal, wherein the RF signal is a vector signal includes a plurality of signal components corresponding respectively to a plurality of receiver antennas;

(j) determining an operating SNR based on a current modulation scheme and current number of spatial streams for the RF signal.

In some embodiments, the modifying operation 930 includes activating an analog cancellation circuit in response to a determination that a level of received interference has increased, wherein the analog cancellation circuit equalizes for distortions introduced by nonlinearites of said at least one analog circuit.

Figure 10:
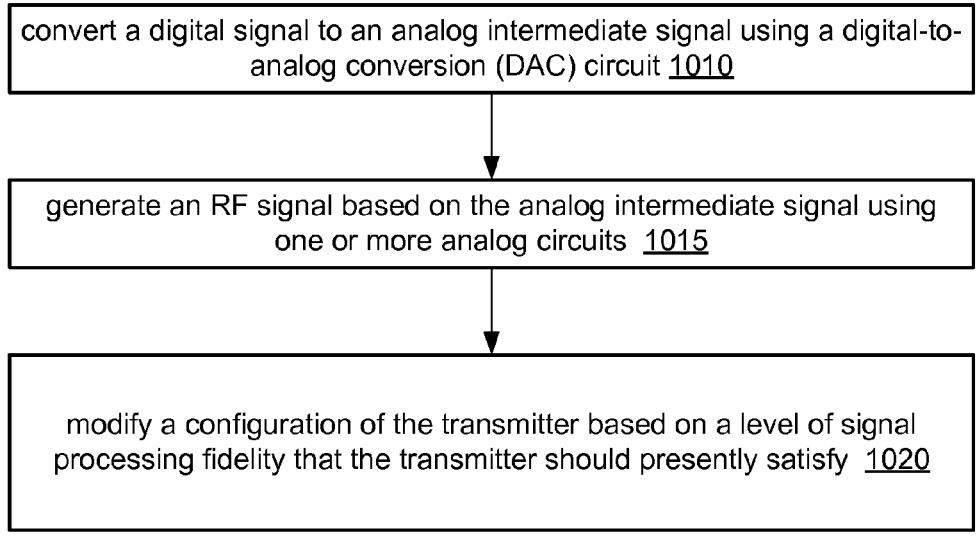
FIG. 10 illustrates a method for operating a transmitter, according to some embodiments.

In one set of embodiments, a method 1000 for operating a wireless transmitter may include the operation shown in FIG. 10. (The method 1000 may also include any subset of the features, elements and embodiments described above.) The wireless transmitter may be part of a UE device, e.g., as variously described above.

At 1010, the UE device may convert a digital signal to an analog intermediate signal using a digital-to-analog conversion (DAC) circuit. The digital signal may be a complex-valued sequence. Thus, in some embodiments, the DAC circuit may include at least two channels, i.e., one channel for the inphase component of the digital signal and another channel for the quadrature component of the digital signal. The digital signal may carry information to be transmitted to a base station (or, to a communication network via the base station, e.g., an LTE network). In some embodiments, the digital signal may be an OFDM signal or a single-carrier FDMA (SC-FDMA) signal. (FDMA is an acronym for Frequency Divisional Multiple Access.)

At 1015, the UE device may generate an RF signal based on the analog intermediate signal using one or more analog circuits, e.g., as depicted in FIG. 8. It should be understood that the principles of the present disclosure may be practiced with any of a wide variety of transmitter architectures, and the architecture of FIG. 8 is not meant to be limiting. The RF signal may be transmitted onto the transmission medium using one or more antennas.

At 1020, the UE device (e.g., digital circuitry of the UE device) may modify a configuration of the transmitter based on a level of signal processing fidelity that the transmitter should presently satisfy.

The modification of the transmitter configuration may include one or more of the following. (1) The UE device may adjust a level of analog processing fidelity of at least one of the one or more analog circuits. (2) The UE device may modify a configuration of one or more digital circuits so that the one or more digital circuits operate on the digital signal to pre-correct for distortions to be introduced by the one or more analog circuits. The action of operating on the digital signal is performed prior to said conversion to the analog domain.

In some embodiments, the level of signal processing fidelity may be determined based on one or more of the following.

(A) The level of signal processing fidelity requirements may be determined based on the power of transmit leakage into the receive path. (The UE device may also include a receiver. The "receive path" is the signal processing path of the receiver.) In some embodiments, transmit leakage may be cancelled before the low noise amplifier (LNA) of the transmitter, therefore relaxing the distortion requirements on the LNA.

(B) The level of signal processing fidelity may be determined based on error vector magnitude (EVM) of the above-described RF signal (and/or the error vector magnitude of the RF signal captured by the UE's receiver). The EVM of the RF signal may be determined by decoding a control signal, for example by decoding the PDCCH of a downlink subframe in LTE.

(C) The level of signal processing fidelity may be determined based on an indicator of a current modulation and coding scheme (MCS) or modulation to be used to generate the digital signal. Some wireless communication standards such as LTE allow the MCS (or modulation) to be dynamically varied. The UE device may vary MCS, e.g., based on link adaptation (ACKs and NACKs). For example, if the number of NACKs received from the base station exceeds a given threshold, then the UE device may employ a lower order modulation constellation and/or a higher coding rate to encode the uplink data included in the digital signal.

(D) The level of signal processing fidelity may be determined based on an indicator of a selection of a particular use case from a plurality of possible use cases, e.g., as variously described above. For example, in one embodiment, the use cases may include:

{single spatial stream, MCS=QPSK};
{more than one stream (MIMO), MCS=64 QAM}.

In other embodiments, a wide variety of different numbers and definitions of use cases are contemplated.

In some embodiments, the action of adjusting the level of analog processing fidelity may include adjusting an extent of linearity of the at least one analog circuit. The analog circuits may include any combination of the following: one or more analog lowpass filters; one or more mixers; one or more bandpass filters; one or more driver circuits; an RF power amplifier; an envelope amplifier.

In some embodiments, the action of adjusting the level of analog processing fidelity is performed in order to achieve a first constraint on error vector magnitude (EVM) and/or a second constraint on out-of-band (OOB) emissions. "Out of band" refers to energy of the waveform that falls outside of the band of interest. The first constraint and second contraint may depend on a selected level (or order) of modulation and coding scheme (MCS).

In some embodiments, the action of modifying the digital signal may include one or more of the following: (a) pre-correcting the digital signal for IQ mismatches to be introduced by the one or more analog circuits; (b) pre-correcting the digital signal for phase noise to be introduced by the one or more analog circuits; (c) pre-correcting the digital signal for transmitter leakage to be introduced (into a receiver of the UE device) by the one or more analog circuits; (d) pre-correcting the digital signal for transmitter nonlinearity distortion to be introduced by the one or more analog circuits. (The term "pre-correcting" refers to an action of correcting a signal for distortion or impairment that is to be introduced by a later stage in the flow of signal processing, so that the output of that later stage will approximate the signal that would have been produced if the later stage behaved in an ideal fashion.)

In some embodiments, the at least one analog circuit includes an analog filter. In these embodiments, the action of adjusting the level of analog processing fidelity may include one or more of the following: (a) adjusting the number of poles of the analog filter; (b) adjusting dynamic range of the analog filter; (c) adjusting an extent of clipping or compression of the analog filter; (d) operating the analog filter with lower supply power; (e) adjusting the bandwidth of a passband of the analog filter; (f) adjusting a center frequency of a transfer function of the analog filter. The bandwidth and/or center frequency of the passband may be adjusted based respectively on the number and/or location(s) of resource blocks allocated to the UE device (by the base station) for uplink transmission.

In some embodiments, the action of modifying the configuration of the transmitter based on the determined level includes adjusting one or more performance parameters of the DAC circuit. For example, the modification may include adjusting one or more of the following: clock frequency of the DAC circuit; order of the Σ-Δ modulator of the DAC circuit; the number of DAC flash bits that feed the DAC circuit. As another example, the quantization noise transfer function of the DAC circuit may be configured to have zeros in or near the interval of the frequencies allocated to the UE device for uplink transmission.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

In some embodiments, an integrated circuit may be configured to include digital and/or analog circuitry, where the circuitry is configured to implement a method, e.g., any of the various method embodiments described herein (or, any combination of the method embodiments described herein, or, any subset of any of the method embodiments described herein, or, any combination of such subsets). The integrated circuit may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a wireless receiver, the method comprising:
    receiving an RF signal;
    operating on the RF signal with one or more analog circuits to obtain an analog intermediate signal;
    sampling the analog intermediate signal using an analog-to-digital conversion (ADC) circuit to obtain a digital signal;
    analyzing the RF signal or the analog intermediate signal or the digital signal to determine a level of signal processing fidelity that the receiver should satisfy; and
    modifying a configuration of the receiver based on the determined level of signal processing fidelity, wherein said modifying includes one or more of the following:
        adjusting a level of analog processing fidelity of at least one of the one or more analog circuits, wherein said adjusting the level of analog processing fidelity includes adjusting an extent of linearity of the at least one analog circuit;
        processing the digital signal using one or more digital circuits to correct analog domain distortions introduced by the one or more analog circuits.

2. The method of claim 1, wherein said RF signal includes a first signal transmitted by a serving base station and one or more interfering signals, wherein the first signal includes information for reception by the wireless receiver, wherein said analyzing and modifying are performed dynamically while the RF signal is being received.

3. The method of claim 1, wherein said analyzing and modifying are performed continuously and/or repetitively in order to respond to dynamic changes in RF signal environment.

4. The method of claim 1, wherein said adjusting the level of analog processing fidelity includes reducing a nonlinearity measure of the at least one analog circuit.

5. The method of claim 1, wherein said processing includes one or more of the following:
    removing IQ mismatches caused by the one or more analog circuits from the digital signal;
    removing phase noise present in the digital signal using common phase error estimation and correction algorithms;
    at least partially removing phase noise present in the digital signal by activating an automatic frequency control (AFC) loop;
    at least partially removing phase noise present in the digital signal by performing repeated channel estimation over time and tracking evolution of the channel estimate;
    removing high frequency components of phase noise in the digital signal using an adaptive intercarrier interference (ICI) cancellation algorithm;
    removing transmitter leakage present in the digital signal;
    removing second order intermodulation distortion (IMD2) from the digital signal;
    removing third order Intermodulation Distortion (IMD3) from the digital signal.

6. The method of claim 1, wherein said modifying configuration of the receiver also includes activating an analog pre-compensation circuit configured to remove transmitter leakage from the RF signal prior to the one or more analog circuits.

7. The method of claim 1, wherein said at least one analog circuit includes an analog filter, wherein said adjusting the level of analog processing fidelity includes one or more of the following:
    adjusting a number of poles of the analog filter;
    adjusting dynamic range of the analog filter;
    adjusting an extent of clipping or compression of the analog filter;
    operating the analog filter with lower supply power;
    adjusting a bandwidth of a passband of the analog filter;
    adjusting a center frequency of a transfer function of the analog filter.

8. The method of claim 1, wherein said at least one analog circuit includes an analog filter, wherein said analyzing includes analyzing a wireless spectrum of the RF signal, wherein said adjusting the level of analog processing fidelity includes dynamically adjusting an extent of linearity of the analog filter based on (a) results of said analyzing the wireless spectrum and (b) the determined level of signal processing fidelity that the receiver should satisfy.

9. The method of claim 1, wherein said analyzing determines interference power in the RF signal and bandwidth of a receive signal in the RF signal, wherein said modifying the configuration of the receiver is based on (a) the determined interference power, (b) the determined bandwidth and (c) the determined level of signal processing fidelity that the receiver should satisfy.

10. The method of claim 9, wherein said modifying the configuration of the receiver includes adjusting one or more performance parameters of the ADC circuit.

11. The method of claim 1, wherein said analyzing includes one or more of the following:
(a) determining power of an in-band (IB) spectrum and power of an out-of-band (OOB) spectrum of the RF signal;
(b) determining power of transmit leakage in the receiver;
(c) recovering a message encoded in the RF signal, wherein the message has been embedded in the RF signal by a remote transmitter of the RF signal, wherein the message indicates the level of signal processing fidelity;
(d) recovering an indicator of a current modulation and coding scheme (MCS) or modulation order from a portion of the RF signal;
(e) measuring power of one or more adjacent channels;
(f) determining a number of resource blocks or bandwidth allocated to the receiver in the RF signal;
(g) determining power levels of blockers in the RF signal;
(h) determining position of one or more resource blocks allocated to the receiver within a frequency band of the RF signal;
(i) determining a number of spatial streams carried in the RF signal, wherein the RF signal is a vector signal including a plurality of signal components corresponding respectively to a plurality of receiver antennas;
(j) determining an operating SNR based on a current modulation scheme and current number of spatial streams for the RF signal.

12. The method of claim 1, wherein said modifying includes activating an analog cancellation circuit in response to a determination that a level of receiving interference has increased, wherein the analog cancellation circuit equalizes for distortions introduced by nonlinearites of said at least one analog circuit.

13. A user equipment (UE) device comprising:
one or more antennas;
a receiver coupled to the one or more antennas, and configured to:
receive an RF signal via the one or more antennas;
operate on the RF signal with one or more analog circuits to obtain an analog intermediate signal;
sample the analog intermediate signal using an analog-to-digital conversion (ADC) circuit to obtain a digital signal;
analyze the RF signal or the analog intermediate signal or the digital signal to determine a level of signal processing fidelity that the receiver should satisfy; and
modify a configuration of the receiver based on the determined level of signal processing fidelity, wherein said modifying includes one or more of the following: adjusting a level of analog processing fidelity of at least one of the one or more analog circuits, wherein said adjusting the level of analog processing fidelity includes adjusting an extent of linearity of the at least one analog circuit; and processing the digital signal using one or more digital circuits to correct analog domain distortions introduced by the one or more analog circuits.

14. The UE device of claim 13, wherein said analyzing and modifying are performed continuously and/or repetitively in order to respond to dynamic changes in RF signal environment.

15. A method for operating a wireless transmitter, the method comprising:
converting a digital signal to an analog intermediate signal using a digital-to-analog conversion (DAC) circuit;
generating an RF signal based on the analog intermediate signal using one or more analog circuits; and
modifying a configuration of the transmitter based on a level of signal processing fidelity that the transmitter should presently satisfy, wherein said modifying includes one or more of the following:
adjusting a level of analog processing fidelity of at least one of the one or more analog circuits, wherein said adjusting the level of analog processing fidelity includes adjusting an extent of linearity of the at least one analog circuit;
modifying a configuration of one or more digital circuits so that the one or more digital circuits operate on the digital signal to pre-correct for distortions to be introduced by the one or more analog circuits, wherein said operating on the digital signal is performed prior to said converting.

16. The method of claim 15, wherein said adjusting the level of analog processing fidelity is performed in order to achieve a first constraint on error vector magnitude (EVM) and/or a second constraint on out-of-band (OOB) emissions, wherein said first constraint and second constraint depend on a selected level of modulation and coding scheme (MCS).

17. The method of claim 15, wherein said modifying the digital signal includes one or more of the following:
pre-correcting the digital signal for IQ mismatches to be introduced by the one or more analog circuits;
pre-correcting the digital signal for phase noise to be introduced by the one or more analog circuits;
pre-correcting the digital signal for transmitter leakage to be introduced by the one or more analog circuits;
pre-correcting the digital signal for transmitter nonlinearity distortion to be introduced by the one or more analog circuits.

18. The method of claim 15, wherein said at least one analog circuit includes an analog filter, wherein said adjusting the level of analog processing fidelity includes one or more of the following:
adjusting the number of poles of the analog filter;
adjusting dynamic range of the analog filter;
adjusting an extent of clipping or compression of the analog filter;
operating the analog filter with lower supply power;
adjusting a bandwidth of a passband of the analog filter;
adjusting a center frequency of a transfer function of the analog filter.

19. The method of claim 15, wherein the level of signal processing fidelity is determined based on one or more of the following:
- (a) power of transmit leakage into a signal processing path of a receiver;
- (b) error vector magnitude (EVM) of the RF signal;
- (c) an indicator of a current modulation and coding scheme (MCS) or modulation to be used to generate the digital signal;
- (d) an indicator of a selection of a particular use case from a plurality of possible use cases.

* * * * *